Aug. 7, 1945.   C. W. McCOY   2,381,609
IGNITION ANALYZER
Filed Oct. 5, 1942   2 Sheets-Sheet 1

Inventor
CHARLES W. McCOY.
By James M. Abbott
Attorney

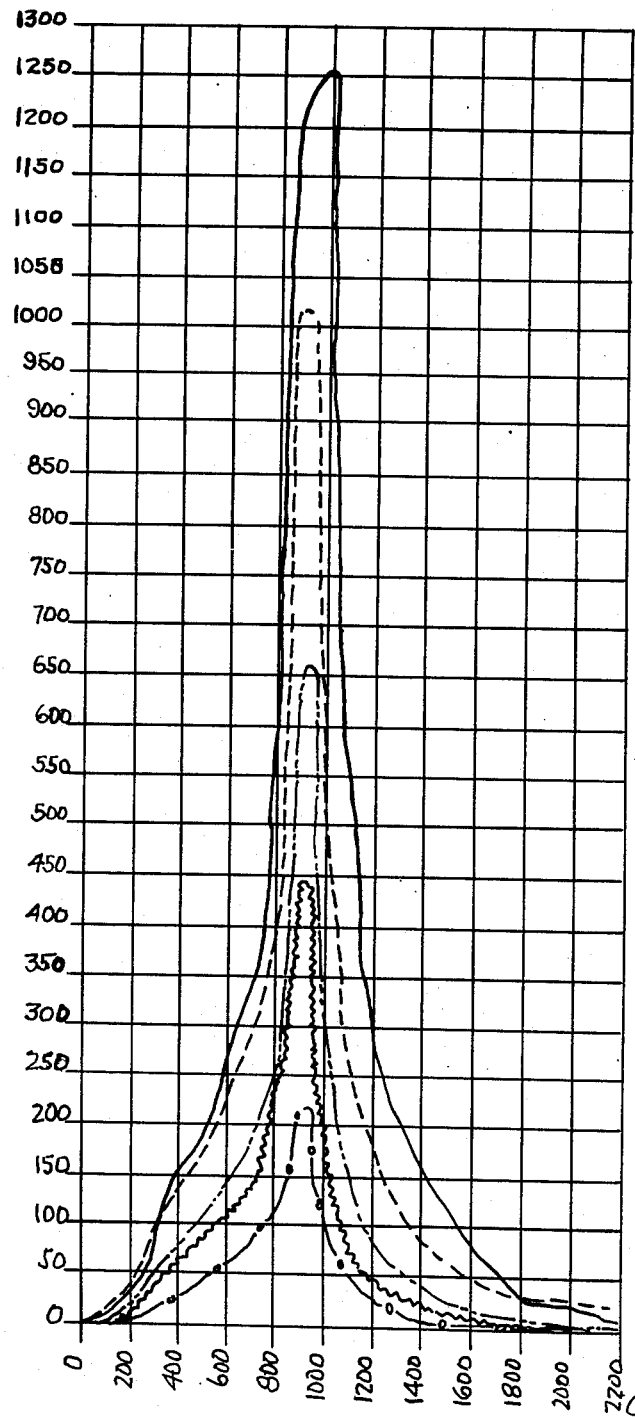

Patented Aug. 7, 1945

2,381,609

UNITED STATES PATENT OFFICE 2,381,609

IGNITION ANALYZER

Charles W. McCoy, Ontario, Calif.

Application October 5, 1942, Serial No. 460,839

9 Claims. (Cl. 175—183)

This invention relates to internal combustion engines, and particularly pertains to an ignition analyzer.

In connection with the performance of internal combustion engines, it has been found that regardless of the care taken in the selection and assembly of parts of the engine ignition system numerous conditions arise which objectionably decrease the efficiency of engine performance, and in instances render the engine inoperative. The sources of these engine troubles cannot be determined completely when the engine is on a test block, and can only be located under actual working performance of the engine. Ignition testing of a stationary engine or an automotive engine may be carried out with reasonable accuracy save for certain factors which cannot be observed readily. When, however, an internal combustion engine is used within aircraft, it is obvious that failure of accurate diagnosis of engine ignition trouble may be dangerous, and that accurate means must be found to detect and analyze every deficiency in ignition equipment and operation under ground testing conditions or when in the air at varying altitudes and meteorological conditions.

Ignition troubles usually depend upon one or more of three factors, to-wit: spark plug voltage, magneto primary voltage, and engine performance. These factors result in two principal indications, one producing a condition of low voltage, and another producing a condition of high voltage. Low voltage conditions, for example, may be brought about by a spark plug which has been partially short-circuited, which has a narrow spark gap, or in which leaky spark plug lead lines exist. High spark plug voltage may indicate an oil filled spark plug gap, wide spark plug gaps, or partially open circuits as produced by loose connections leading to the spark plugs, or by broken lead wires. It is also known that when an engine develops erratic spark plug voltage, it indicates a defective spark plug or a defective lead-in wire, particularly when this result is noted in testing one spark plug. When two spark plugs of the same cylinder are tested and erratic spark plug voltage is noted, this usually indicates uncertain compression of the cylinder, as caused by defective valves or valve action. When erratic spark plug voltage is noted at all plugs in the engine, this usually indicates faulty operation of the magneto. A low steady primary voltage reading at the time that erratic spark plug voltages are noted, particularly at high engine speed, indicates a defective secondary condenser. A low steady primary voltage reading with low spark plug voltages under conditions at which it is impossible to obtain high engine speeds indicates a defective primary condenser, or low magneto output. At times an erratic primary voltage reading is noted. This usually indicates defective spark plug points or point operation and low or high voltage at individual spark plugs, which can be located and corrected. Generally, under conditions of low voltage a short circuit is indicated or a depletion of power input to the engine, resulting in faulty engine operation. When a high voltage condition exists, there is a possibility that the wiring harness of the engine will be overtaxed by the voltage, so that the insulation may be damaged and a leakage will result, which might be disastrous. This is particularly true when the engine is travelling at high altitudes or under unfavorable weather conditions, since an engine failure may result to cause a forced landing. A common cause of this last named condition is produced by an accumulation of oil on the points of the spark plug, a condition which cannot be observed.

It is desirable to provide a device which may be detachably secured to the ignition system of an internal combustion engine for testing, while the engine is stationary or in transit, and which device will indicate to the ordinary mechanic the condition of the ignition system, so that a defect may be instantly located and corrected without requiring a complete overhaul or check of the engine and its parts.

It is the principal object of the present invention, therefore, to provide an ignition testing device by which conditions of the ignition may be analyzed and indicated on a simple indicating device, which will act to test each of the spark plugs of an engine individually, and indicate their condition uniformly at low and high speeds and under conditions of low and high voltage, without drawing any appreciable amount of electric current from the ignition system.

The present invention contemplates the provision of detector elements associated with the lead wires of each spark plug of an engine, said detector elements obtaining electric energy from the lead wires by induction, the wires from the detector units preferably being led to a set of sockets mounted at a convenient position on the equipment with which the engine is used, and to which a jack block may be attached, establishing connections with a selector switch and a detector unit through which the induced current from the various spark plug lead lines may be conducted and amplified, and by which a direct and simple indication of a high or low voltage condition in the various ignition circuits may be indicated.

The invention is illustrated by way of example in the accompanying drawings in which:

Fig. 2 is a graph showing the performance of the apparatus and the frequency response of the amplifier and filter when the electrical elements have one particular value.

Figure 1:
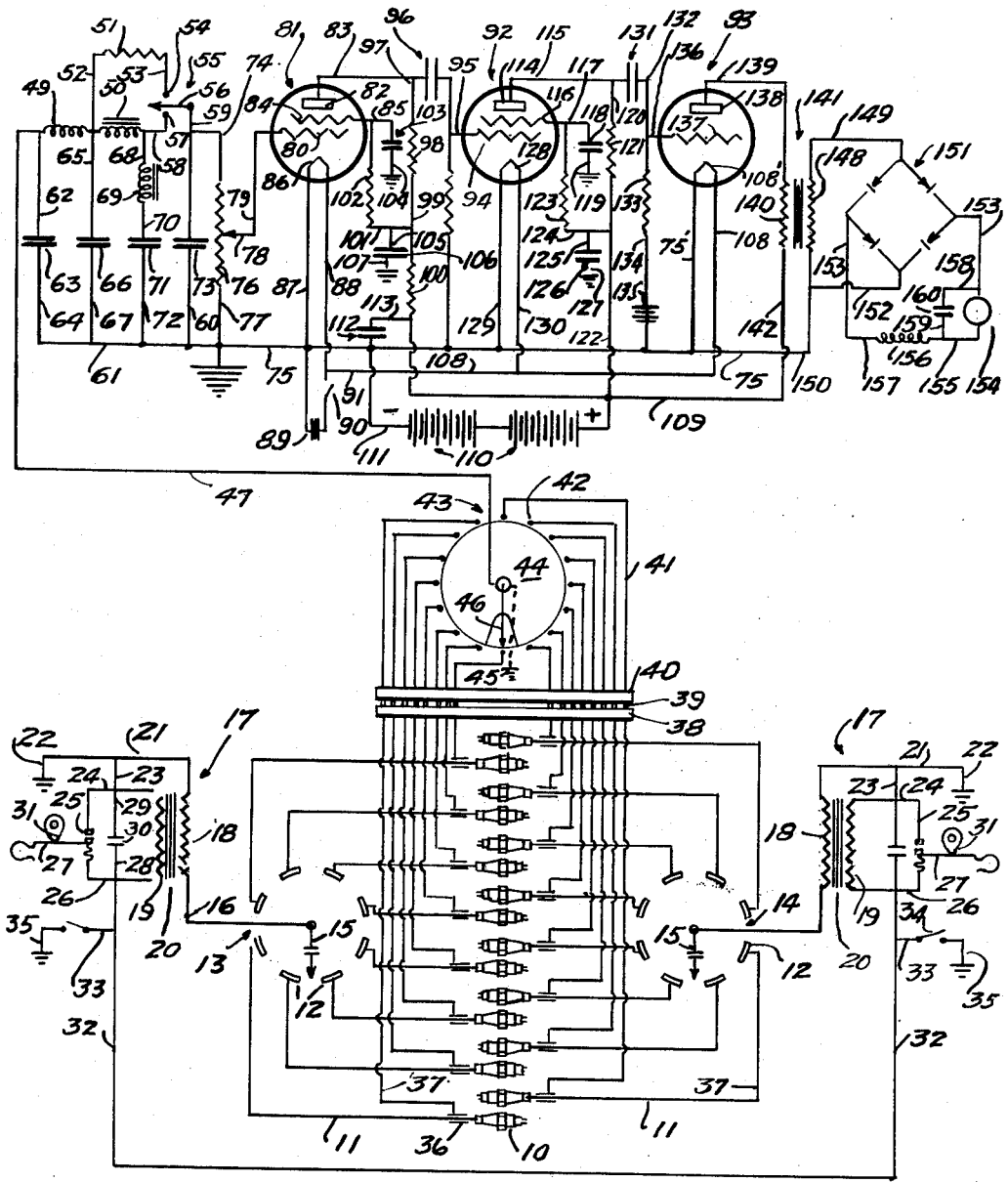
Figure 1 is a view in diagram indicating the ignition system of an internal combustion engine and the ignition analyzer connected therewith, and with which the present invention is particularly concerned.

Referring more particularly to the drawings, 10 indicates individual spark plugs of an internal combustion engine. The spark plugs are here shown as arranged in pairs. It will be understood that each pair of spark plugs is provided for one cylinder of the engine, such as is common practice in airplane construction. The drawings indicate spark plugs for an eight-cylinder engine. It will be understood of course that this device is applicable to engines having any type of ignition, cylinder number, or spark plug arrangement, and that this description merely demonstrates the invention by way of example.

Connected to the individual spark plugs are lead lines 11. The lead lines pass to the contact segments 12 of distributor units 13 and 14. The distributor unit 13 is provided with an arm 15 connected to a lead wire 16, which provides a conductor from the arm 15 to a magneto unit, generally indicated at 17. This unit includes a primary coil 18 and a secondary coil 19 operating in connection with the usual magneto armature generally indicated at 20. The opposite end of the primary coil 18 is provided with a conductor 21 leading to a ground wire 22. At a point in the length of the conductor 21 a wire 23 is provided. Thus, one end of each of the primary and secondary windings is grounded. The conductor 23 is connected to a conductor 24 secured to an end of the secondary winding 19 and leading to a circuit breaker contact 25. The opposite end of the secondary winding is provided with a conductor 26 which is connected to a circuit breaker arm 27. Connected across the conductors 24 and 26 are conductors 28 and 29 attached to a condenser 30. The circuit breaker as usual is operated by a cam 31. Secured to the conductor 26 is a lead wire 32 to which a wire 33 is attached. This wire is connected to a switch 34, the opposite pole of which is connected by a wire 35 to ground. Since the construction of the distributor, the magnet and the circuit breaker are of conventional design, it is to be understood that the distributor 14 and the magneto and circuit breaker associated therewith are duplicates of the parts previously described, and that these parts will be indicated by identical numerals.

It will be understood that the various lead wires 11, which extend from the distributor to the individual spark plugs, are assembled in what is known as a harness, which acts as a shield. In the present instance the individual cables 11 are fitted with detector sleeves 36 through which the cables extend at a point conveniently near to the spark plug served by the cable. This sleeve is preferably held in spaced relation from the cable, so that a condenser effect will be produced between the cable and the sleeve, as electric energy is imparted to the sleeve by induction. The sleeves are each provided with an individual conductor 37 leading to individual sockets in a panel 38. The panel 38 may be mounted at any convenient position. On an airplane it is desirable to mount it in a shielded compartment on the side of the fuselage, so that it may be conveniently reached.

The panel 38 is provided to receive the plugs 39 of a removable block 40. This carries a plurality of lead wires 41 attached to contact points or segments 42 of a selector switch 43. Rotatably mounted concentrically of the contacts 42 is a contact element 44, which is grounded at 45 and has a separate contact finger 46. The element 44 simultaneously electrically contacts all of the points 42 with the exception of one. Thus, these points are grounded out of any circuit. The member 46 contacts the remaining point and is fitted with a lead wire 47 connected to the ignition analyzer unit generally indicated at 48. It is to be understood that the selector switch 43 and the unit 48 may be assembled in a portable cabinet, and that the conductors 41 may be of any desired length, so that the cabinet may be placed in convenient relation to an engine which is relatively stationary when tested, or may be placed in the automobile or airplane driven by an engine to be tested, so that actual performance tests may be made. This is particularly desirable in connection with airplane work, since the cabinet may be placed in the cabin of the airplane and the engine tested under all conditions of flight.

The analyzer structure 48 includes electrical apparatus for receiving the electrical impulses from the detector elements 36, and thereafter amplifying these impulses and transmitting them to the hand of an indicating dial so that normal, low, and high voltages may be ascertained. It is to be understood that the conductors 37, as well as the conductors 41 and 47, are shielded, so that the current impulses picked up from the engine will not be affected by radio waves or other outside electrical impulses. The conductor 47 is the lead wire from the selector switch and delivers the input current to the analyzer. The conductor 47 is connected to one side of a radio frequency impedance coil 49 having a value of 2.5 millihenries. The opposite side of this coil is connected to one side of a choke coil 50 which has a value of 11.0 henrys. A resistor 51 is provided with a conductor 52 which establishes a connection between the coil 49 and the choke 50. The opposite end of the resistor 51 is attached to a conductor 53 leading to a contact 54 of a switch structure 55. The switch has a movable contact arm 56 which may engage a contact 57 connected with a conductor 58. The conductor 58 is attached to an end of the choke 50. Thus, the switch member 56 may establish a flow of current through the resistor 51 or the choke 50. The resistor 51 has a value of substantially .1 megohm. The switch member 56 is provided with a conductor 59. This connects with a wire 60. The electrical elements previously described are a part of the filter structure which filters out the undesirable circuits and makes it possible to establish a desired peak of resonant frequency in the apparatus.

The filter unit, as previously stated, is provided with a lead-in wire 47. It is also provided with a ground wire 61 attached to the lead wire 47, which is connected to a condenser 63. This condenser has a value of .01 microfarad. The opposite side of this condenser is provided with a conductor 64 leading to the ground wire 61. At a point between the coil 49 and the choke 50 is a conductor 65 which is secured to one side of a condenser 66. This condenser has a value of .005 microfarad. The opposite side of the condenser 66 is attached to the ground lead wire 61 by a conductor 67. The condensers 63 and 66 act as a high frequency cut-off in the filter circuit.

Connected to the conductor 58 is a conductor 68 which is attached to one side of a choke coil 69. This coil has a value of 2.2 henrys. The opposite side of the coil is provided with a conductor 70 establishing connection with a condenser 71. The condenser 71 has a value of 25.0 microfarads. The condenser is connected to the ground lead wire 61 by a conductor 72. The conductor 60 is electrically connected to a condenser 73. This condenser has a value of .05 microfarad. The entire apparatus which has been described as wired to the power lead wire 47 and the ground wire 61 is a filter circuit.

The amplifier structure is connected to the filter circuit by a conductor 74 which is secured to the conductor 59 and a conductor 75 secured to the ground wire 61. One end of the conductor 74 leads to the coil of a variable resistance 76. The other end of the resistance is provided with a wire 77 connecting with the conductor 75. The variable resistance 76 has a value of .25 megohm potentiality. The variable resistance 76 is provided with a movable element 78 carrying a conductor 79. The conductor 79 is attached to the grid 80 of a vacuum tube 81. The vacuum tube is known commercially as 1N5-GT. Its construction and operation will be obvious. The vacuum tube 81 includes a plate 82 connected with a conductor 83. A grid 84 is also included within the tube and connects to a conductor 85. The tube 81 is fitted with a B-battery filament 86 provided with conductors 87 and 88. The conductors 87 and 88 lead to the opposite poles of a B-battery 89 which has a potential of 1½ volts. A switch 90 makes and breaks the circuit from this battery. The conductor 87 is electrically connected with the wire 75. The conductor 88 is connected to a distributing wire 91 which feeds electric current to vacuum tubes 92 and 93. The vacuum tube 92 is similar to the tube 81. The vacuum tube 93 is designated in the trade as 1G4-GT. The grid 94 of the vacuum tube 92 is provided with a conductor 95 which leads to one side of a condenser 96. The opposite side of this condenser is connected to the conductor 83. The condenser has a value of .1 microfarad. Connected to the conductor 83 between the vacuum tube 81 and the condenser 96 is a wire 97 which is secured to one end of a resistor coil 98. The opposite end of this coil is provided with a wire 99 which connects it with a resistor coil 100. The value of the coil 98 is .1 megohm. The value of the coil 100 is 2000 ohms.

Attached to the conductor 99 between the resistors 98 and 100 is a conductor 101. The conductor 101 is secured to one side of a resistor 102. The opposite side of this resistor is attached to the conductor 85. The value of this resistor is .4 megohm. The conductor 85 has a dead-end connection to a condenser 103. The opposite side of this condenser is grounded by a wire 104. The condenser 103 has a value of .05 microfarad. A conductor 105 is connected to the wire 101 between the resistors 98 and 102. This conductor is secured to a condenser 106, the opposite side of which is grounded by a wire 107. The value of the condenser is .05 microfarad. Attached to the resistor 100 is a feed wire 108. This feed wire leads to the positive lead 109 of a battery 110. The battery has a 90-volt rating. The opposite side of the battery is provided with a feed wire 111 which is cross-connected with the ground wire 75 and is attached to one side of a condenser 112. The opposite side of this condenser is attached to the wire 108 through a wire 113. This wiring in combination with the resistor 100 tends to keep the tubes in the set from back-feeding. The vacuum tube 92 within which the grid 94 occurs is provided with a plate 114 connected to a wire 115. A grid 116 is also within the tube 92 and is connected to a wire 117. The wire 117 connects to a condenser 118, the opposite side of which is grounded by a wire 119. The condenser 118 has a value of .05 microfarad. Connecting with the conductor 115 is a wire 120 which is attached to one side of a resistor 121. The opposite side of this resistor is connected to a feed wire 122 communicating with the positive side of the battery 110. A resistor 123 connects with the wire 117 at one end and with a wire 124 at its opposite end. This last named wire connects with the feed wire 122. A wire 125 connects to the wire 124 between the resistors 121 and 123 and is attached to a condenser 126, the opposite side of which is grounded by a wire 127. The resistor 123 has a value of .4 megohm. The condenser 126 has a value of .05 microfarad. The vacuum tube 92 has a filament 128 connected to conductors 129 and 130. The conductor 129 leads to the wire 75 and the conductor 130 is connected with the wire 91. A filament circuit is completed through these conductors to the battery 89.

The conductor 115 connects to one side of a condenser 131. This condenser has a value of .1 microfarad. A wire 132 is connected to the opposite side of this condenser and leads to one side of a resistor 133. The resistor 133 has a value of .5 megohm. The opposite side of the resistor is provided with a wire 134 connecting with one side of a battery 135. The opposite side of this battery connects with the wire 75. At a point between the condenser 131 and the resistor 133 is a wire 136 connected to a grid 137 of the vacuum tube 93. A plate 138 of this tube is provided with a conductor 139 leading to one side of a primary coil 140 of a transformer 141. The opposite side of the primary coil is provided with a wire 142 which connects with the lead wire 109 on the positive side of the battery 110.

The transformer 141 includes the primary winding 140 and the secondary winding 148. The secondary winding is provided at one end with a conductor 149 and its opposite end with a conductor 150. The conductor 150 connects with the wire 75. The conductor 149 connects with one pole of a copper-oxide rectifier 151. The diametrically opposite pole of this rectifier is provided with a wire 152 which connects to the conductor 150. Thus, the rectifier is placed across the poles of the secondary transformer winding 148 by conductors 149 and 150. An intermediate pole of the rectifier 151 is provided with a conductor 153 which connects to one post of an indicator, such for example as the current meter 154. The opposite post of the current meter is provided with a conductor 155 which leads to one side of a choke coil 156. This coil has a value of 30 henrys. The opposite side of this coil is provided with a conductor 157 which leads to the remaining pole of the rectifier 151. Across the current meter 154 and attached to conductors 153 and 155 are conductors 158 and 159 secured to an intermediate condenser 160. The condenser 160 has a value of 25 microfarads.

From the foregoing explanation it will be seen that the indicating structure with which the present invention is concerned comprises the selector switch unit 43, a filter unit, an amplifying unit, and an indicator unit. It has been explained that the indicating unit includes a rectifier and a current meter, which will cause an indicating hand on the current meter to swing to and from an intermediate arc on the dial of the meter so that the action and magnitude of the current will be indicated visually and without the necessity of making accurate scientific observations and calculations. The meter is therefore fitted with a dial divided into three segments separately colored for convenience. A center segment is colored green and when the indicating hand of the meter lies within this segment area it indicates that the performance of the spark plug being tested is normal. A segment on the low side of the dial is colored red and indicates a low voltage reading, and a segment on the high side of the dial is colored amber and indicates a high voltage reading.

It should be pointed out that when testing an ignition system it is desired to obtain information as to whether or not a sufficiently strong spark discharge is being obtained at each spark plug, and if not, what is the cause of this trouble. The present invention has been designed to give this information. In analyzing the theory of operation of the present invention and the information obtained by its use, it must be borne in mind that the current which is analyzed by the tester here shown is derived directly from the ignition system, and that no outside source of energy, such as an oscillator or a high voltage source of some type, is used to test a static ignition system, for in the present case the tests are dynamic tests of the ignition system in actual operation to determine if the ignition system is functioning properly, and if not to ascertain the source or cause of defect.

In operation of the present invention the engine is started and the distributors function in their normal manner to supply a high tension spark to the spark plugs 10. Each of the lead lines 11 are fitted with the sleeves 36 by which the current emanating from the lead lines 11 will be gathered by the sleeves 36 and conducted through the wires 37. As the engine continues to function the movable member of the selector switch 43 is manipulated to successively establish connection between the various wires 41 and the feed wire 47. It has been explained that all of the wires 41 save the wire 41 in direct contact with the feed wire 47 through the movable switch element 46 are grounded, so that there will be no possibility that fugitive current will leak from the other spark plugs and give a distorted and inaccurate reading. As the spark plug circuit of a selected spark plug 10 is established and during the period in which it persists, a circuit will be established through the lead wire 47 to the filter, amplification and indicator circuits of the apparatus, so that a final circuit will be built up at the meter 154, which will indicate the condition of the ignition circuit, the spark plug in that circuit, and the distributor system. When the circuit is established by the distributor system and a capacity inductance circuit is built up from the spark plug lead wire 11 through the sleeve 36 to the corresponding wire 37, the circuit in the analyzer structure will build up to a peak load representing the frequency response through the amplifier and filter to the current meter 154.

Attention is particularly directed to the fact that functioning of the present apparatus insures a tuned filter input circuit which will eliminate all high frequency currents set up by the normal spark plug discharges in the spark plug system. In obtaining this action the radio frequency choke coil 49 cooperates with the condenser 63 to filter out objectionable high frequency currents radiated and picked up by the various pick-up elements of the system. At the same time the iron core radio frequency choke coil 50 cooperates with the condenser 73 to provide a highly selective tuned radio frequency input circuit. The iron core radio frequency choke coil 69 acting with condenser 71 establishes a low frequency cut-off of approximately forty cycles. It will be recognized that this acts to short out the low frequencies not desired for measurement. Under testing conditions it has been found that the basic pulse has a peak which is too high and of an excessively short duration, and that furthermore, it has a low energy value. However, by using a tuned input circuit with the selective characteristics, as shown in Fig. 2 of the drawings, the basic pulse from each spark discharge energizes the circuit, causing a signal of a frequency which is determined by the tuned circuit including coil 50, condenser 73, coil 69, and condenser 71. This tuned circuit operates at the established tuned frequency but has an amplitude proportional to the signal picked up from the ignition wire and set off by the spark discharges at the spark plug. This damped wave train appears across the volume control including the elements 76 and 78. A desired proportion of this signal is then fed to the grid 80 of the amplifier tube 81 and successively amplified in tubes 92 and 93 so that output energy is obtained having sufficient strength to actuate the rectifier and the milliameter. Considerable experimentation has been made to analyze this frequency response and to determine just what relation there is between the current gathered by the sleeve 36 and passing through the analyzer to the meter 154. It has been found that when different values have been given to the condenser 73 different characteristic curves will be developed having direct relation to the speed of the motor and the voltage imposed upon the amplifying circuit. For example, the frequency response curve will be relatively flat if the value of the condenser 73 is .005, and it will increase in height and sharpness if the value of this condenser is changed to one having greater microfarad capacity, as for example .05 microfarad, as here disclosed. The characteristics of the frequency gain or response with the condenser 73 having a value of .05 microfarad is shown particularly in Fig. 3 of the drawings. In this graph the frequency response is indicated at five stages and it will be seen that when the undesired interference of the engine system as well as from exterior sources has been filtered out of the analyzer and the remaining current has been amplified, the result will be designated in a sharp and well defined indication on the meter 154.

Thus, by the arrangement of the apparatus here disclosed it is possible for a relatively unskilled testing mechanic to analyze the performance of each of the spark plugs in an engine during ground or flying operations, and to determine definitely which of the spark plug ignition circuits is faulty, and whether or not that circuit is being shorted-out or rendered inefficient by lack of discharge due to the accumulation of oil at the spark plug. It will also be seen that the analyzer circuits here shown make it possible for the performance of the distributor and the high frequency ignition equipment to be easily tested in the same manner, so that under conditions of ground altitude or high flying altitude the exact performance of the engine and all of its spark plugs can be definitely and easily determined.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. An apparatus for testing a plurality of separate high tension ignition circuits, which comprises means disposed adjacent said circuits for receiving high frequency current impulses therefrom, conductors, one for each of said means, a feed wire, a switch interposed between said conductors and the feed wire, whereby circuit will be established from one of said conductors to the feed wire and the circuits of each of the other of said conductors will be grounded, a filter structure to which said conductor leads and within which selected bands of high frequency current are filtered out and other bands of high frequency current are allowed to pass through the filter, amplifying means connected with the filter and receiving the selected bands of current, and an indicating meter receiving said amplified current and indicating the magnitude thereof.

2. The structure of claim 1 including means within the filter device to establish the frequency response of the filter and the amplifier.

3. A device for separately testing a plurality of separate high tension ignition circuits of an internal combustion engine, which device includes individual capacity collectors disposed adjacent to the individual ignition lead wires, separate conductors, one for each of said collectors, a selector switch to which each of said separate conductors are led, a lead wire from said switch and means embodied in the switch for individually connecting one of said conductors to the lead wire while grounding all of the other of said conductors, a ground wire, a plurality of fixed condensers between the ground wire and the lead wire and connected thereacross, providing a tuning circuit, a variable resistance coil connected across said ground and feed wires, a conductor from the movable element of the variable resistance, amplifying means between said conductor and the ground wire, a power circuit therefor, an output wire from the amplifying means, a transformer having a primary winding connected between said output wire and the power means, an output wire from the secondary winding of said transformer, the opposite side of said secondary wiring connecting with said ground wire, a rectifier connected across said secondary winding, and an indicator electrically connected to the rectifier.

4. The structure of claim 3 including a radio frequency choke coil interposed in the lead wire circuit.

5. The structure of claim 3 including a resistance coil connected at one end to the lead wire, and a switch by which said coil may be placed in series with said lead wire circuit.

6. A device for separately testing a plurality of separate high tension ignition circuits of an internal combustion engine, which device includes individual capacity collectors disposed adjacent to the individual ignition lead wires, separate conductors, one for each of said collectors, a selector switch to which each of said separate conductors are led, a lead wire from said switch and means embodied in the switch for individually connecting one of said conductors to the lead wire while grounding all of the others of said conductors, a ground wire, a radio frequency choke coil in said lead wire circuit, a second choke coil connected with the first named choke coil in said lead wire circuit, a conductor leading from said second choke coil and electrically connected, a variable resistance coil connected at one end to said conductor, the opposite end of said conductor being connected to the ground wire, a condenser electrically connected to the ground wire and the lead wire in advance of the radio frequency choke coil, a condenser connected to the lead wire between the two choke coils and connected at its opposite side to the ground wire, a condenser connected to the conductor leading from the second named choke coil on one side and to the ground wire on the opposite side, a plurality of amplifying tubes connected in series and connected at one end of their circuit to the movable element of the variable resistance, a transformer at the oposite end of said circuit, a rectifier connected to the opposite poles of the secondary winding of the transformer, and an indicator connected to opposite remaining poles of the rectifier.

7. The structure of claim 6 including a condenser connected across the opposite poles of the indicator.

8. The structure of claim 6 including a source of electric power for said tubes, and an isolating resistance between the tubes and the source of power, whereby back-feeding of current is prevented.

9. The structure of claim 6 including a source of electric power for said tubes, an isolating resistance between the tubes and the source of power, whereby back-feeding of current is prevented, and a condenser interposed in the plate circuit between the vacuum tubes.

CHARLES W. McCOY.